H. E. WARREN.
SELF STARTING SYNCHRONOUS MOTOR.
APPLICATION FILED FEB. 5, 1917.

1,283,433.

Patented Oct. 29, 1918.

INVENTOR.
Henry E. Warren
BY
Jas. H. Churchill
ATTORNEY.

UNITED STATES PATENT OFFICE.

HENRY E. WARREN, OF ASHLAND, MASSACHUSETTS, ASSIGNOR TO WARREN CLOCK COMPANY, OF ASHLAND, MASSACHUSETTS, A CORPORATION OF MAINE.

SELF-STARTING SYNCHRONOUS MOTOR.

1,283,433.   Specification of Letters Patent.   Patented Oct. 29, 1918.

Application filed February 5, 1917. Serial No. 146,583.

*To all whom it may concern:*

Be it known that I, HENRY E. WARREN, a citizen of the United States, and a resident of Ashland, in the county of Middlesex and State of Massachusetts, have invented an Improvement in Self-Starting Synchronous Motors, of which the following description, in connection with the accompanying drawings, is a specification, like characters on the drawings representing like parts.

This invention relates to self starting synchronous motors substantially of the character shown and described in applications Se. No. 134,260 filed by me December 1, 1916, and Se. No. 138,763, filed by me December 26, 1916.

The invention has for its object to provide self starting synchronous motors of increased power, as will be described.

To this end, the motor is provided with a rotor having a member or element of substantially strong starting characteristics and a member or element having substantially strong synchronizing characteristics, which are arranged with relation to the magnetic field of the motor so that the synchronizing element is removed from the maximum influence of the magnetic field when the rotor is at rest, and is brought under said maximum influence when the rotor element substantially reaches synchronous speed.

Provision may and preferably will be made for retarding or resisting movement of the synchronizing element into the field of maximum influence, as will be described.

Provision is also made for permitting the rotor to run without load while approaching synchronous speed and to be coupled to its load at or about the time the rotor reaches synchronous speed.

These and other features of this invention will be pointed out in the claims at the end of this specification.

Figure 1:
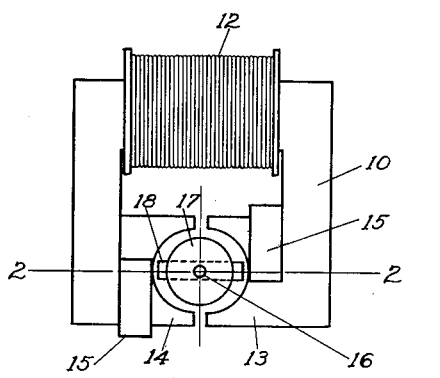
Figure 1 is a plan view of one form of synchronous motor embodying this invention.
Figure 2:
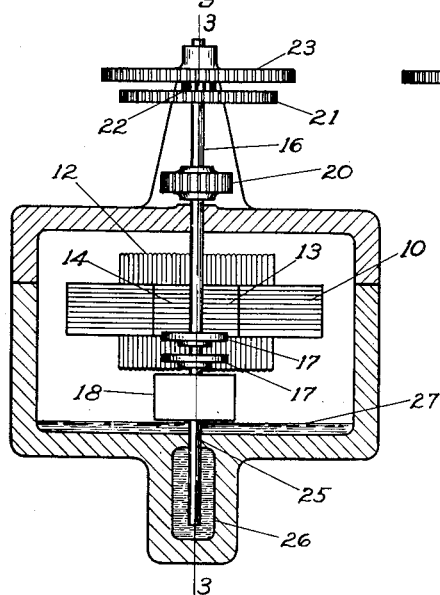
Fig. 2, is a vertical section on the line 2—2, Fig. 1, with parts in elevation.
Figure 3:
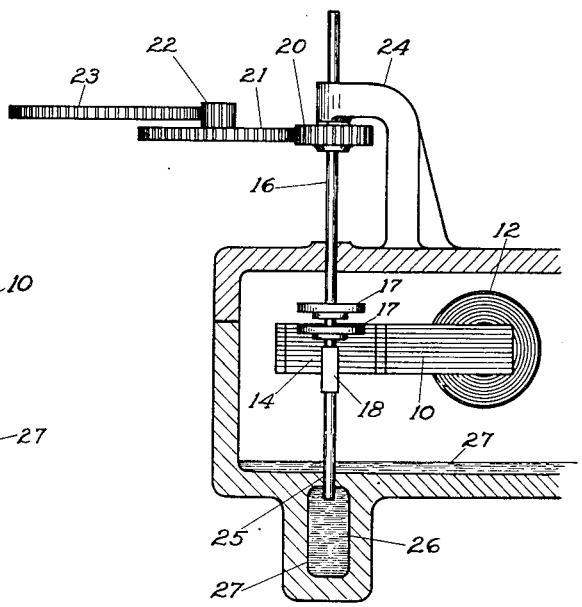

Fig. 3, a vertical section on the line 3—3, Fig. 2, looking toward the left, with parts in elevation.

In the present instance I have illustrated one embodiment of the invention, in which the field magnet 10 provided with the coil 12 and with the pole pieces 13, 14, having the shading coils 15 for producing a magnetic field which rotates about a shaft 16, may be and is substantially the same as shown and described in my applications above referred to. Mounted upon the shaft 16 is a rotor provided with a plurality of members or elements, one of which has strong starting characteristics and the other strong synchronizing characteristics. In the present instance I have illustrated preferred forms of these elements or members, but it is not desired to limit the invention to the particular forms or construction shown. The rotor member having strong starting characteristics consists of one or more hardened steel disks 17, herein shown as two in number which are mounted on the shaft 16 to revolve therewith.

The rotor member of strong synchronizing characteristics is shown in the form of a substantially rectangular bar 18, which is mounted on the shaft 16 to rotate therewith, and is located thereon so as to be removed from the center of the magnetic field when the rotor is at rest. The rotor member 18 is a polar rotor which, if it were in the magnetic field would have zero or weak starting torque.

In the present instance, the shaft 16 also has mounted on it a pinion 20, which serves to couple the shaft 16 with the load to be driven, herein represented as a train of gears 21, 22, 23, and the pinion 20 is so located on the shaft 16, that when the rotor is at rest, the pinion 20 is disengaged from the gear 21 as shown in Fig. 2, and no load is connected with the shaft 16. The shaft 16 is journaled in suitable bearings 24, 25, which may be designated the upper and lower bearings, and the latter may be provided with a downwardly extended cavity 26 which contains a portion of the lubricating fluid 27. The fluid in the cavity 26 constitutes one form of means for retarding or resisting axial movement of the rotor shaft 16 under the influence of the magnetic field, for a purpose as will be described.

When the rotor is at rest, that is, when the alternating current is cut off from the coil 12, the parts assume substantially the position shown in Fig. 2, with the shaft 16 in what may be termed its lowered position, with the synchronizing member 18 removed from the maximum influence of the magnetic field and with the starting member 17 within such influence, and with the pinion 20 disengaged from the gear 21. As soon as the alternating current is supplied to the field coil 12, the rotor will start, for the reason that a portion of the starting member 17 is well within the influence of said magnetic field, while the polar or synchronizing member 18 is a considerable distance outside of the dense portion of said field. Moreover, since the pinion 20 is out of mesh with the gear 21, the shaft 16 can revolve very easily. In addition to the motion of revolution which is quickly caused, by the action of the rotating magnetic field upon the hardened steel disks 17, there is also a strong tendency for the rotor members to lift upward so as to reduce as far as possible the reluctance of the magnetic circuit. Consequently the shaft 16 will rise quite rapidly, being somewhat retarded purposely by a dash pot action to the lower bearing 25 and cavity 26. This retardation is for the purpose of permitting the rotor members to reach nearly synchronous speed before the polar or synchronizing member 18 enters the dense portion of the magnetic field, that is, the portion of maximum influence. It is found in practice, that this action is automatically facilitated because the magnetism in the polar member 18 will not be continuously in phase with the magnetism of the rotating field until synchronous speed is reached, and when this happens, the upward pull of the polar member 18 is considerably increased, so that it is quickly dragged on toward the center of the magnetic field as shown in Fig. 3, at which time the pinion 20 is moved into mesh with the gear 21, so that the motor takes on its load. It will therefore be seen, that the motor is provided with practically two forms of rotor elements or members, one of which has strong starting characteristics, and may or may not have synchronous characteristics, and the other of which may have zero or weak starting characteristics but very strong synchronizing characteristics, and then providing for the latter member to be substantially unaffected by the maximum influence of the magnetic field when the motor is started and to be gradually brought under such maximum influence as it comes up to synchronous speed. It will also be observed that the rotor element of strong starting characteristics, to wit: the disks 17, are attracted by the rotating magnetic field and are first moved into the maximum influence of said field and at the same time the element of strong synchronizing characteristics, to wit:—the bar 18 is also moved into the influence of the magnetic field and comes within the maximum influence when synchronism is reached. As the bar 18 is brought into the maximum influence of the field, the disks 17 are moved more or less away from or out of said maximum influence until both elements are in equilibrium with respect to said maximum influence, that is, the magnetic attraction of the field for the disks 17 is in one direction and for the bar 18 is in the opposite direction and equal or substantially so, so that both members of the rotor are attracted equally or substantially equal and the rotor as a unit is in equilibrium and has a definite or permanent relation or position with respect to the rotating magnetic field when the rotor runs in synchronism with the latter.

I have herein shown one form of motor provided with a rotor having one form of member of strong starting characteristics and one form of member of strong synchronizing characteristics, but it is not desired to limit the invention to the particular construction or form herein shown of such members.

Claims:

1. In a self-starting synchronous motor, means for producing a rotating magnetic field, a rotor provided with a member having strong starting characteristics normally located within the influence of said field to be rotated thereby and also to be attracted by said field to move axially with relation to said field, and having a member of strong synchronizing characteristics normally removed from the maximum influence of said magnetic field and movable with the first-mentioned rotor member axially with relation to said field and into the maximum influence of the latter and into a position of equilibrium when synchronism is reached.

2. In a self-starting synchronous motor, means for producing a rotating magnetic field, a rotor provided with an element coöperating with said field and removed from its maximum influence when at rest and responsive to said magnetic field when in motion to be moved axially thereby as synchronism is approached and provided with a second element normally located in said field to be rotated and to be moved axially thereby to bring the first-mentioned element within the maximum influence of said field.

3. In a self-starting synchronous motor, means for producing a rotating magnetic field, a rotor having an element of strong starting characteristics within the influence of said field when the rotor is at rest and responsive to the magnetic influence of said field to be moved axially with respect to the latter, and having a second element of strong synchronizing characteristics removed from the maximum influence of said magnetic field when the rotor is at rest and responsive to the magnetic attraction of said field to be brought into maximum influence thereof and to remove the first-mentioned member from said maximum influence so as to place both members of the rotor in equilibrium with respect to the magnetic field when the rotor runs in synchronism with said field.

4. In a self-starting synchronous motor, means for producing a rotating magnetic field, a rotor provided with an element coöperating with said field and removed from its maximum influence when at rest, and provided with magnetic means normally within said field for moving said rotor element to bring it under said maximum influence.

5. In a self-starting synchronous motor, means for producing a magnetic field, a shaft movable axially in said field, a disk rotor member fast on said shaft and arranged to be within a substantially strong influence of said field when the said shaft is at rest, and a polar rotor member mounted on said shaft and arranged to be removed from the strong influence of said field when the said shaft is at rest and to be brought under said influence by axial movement of said shaft in one direction by the attraction of the magnetic field upon the disk rotor and to be maintained in a definite position within said field when the rotor as a unit is in magnetic equilibrium with relation to said field.

In testimony whereof, I have signed my name to this specification.

HENRY E. WARREN.